Figure 13:
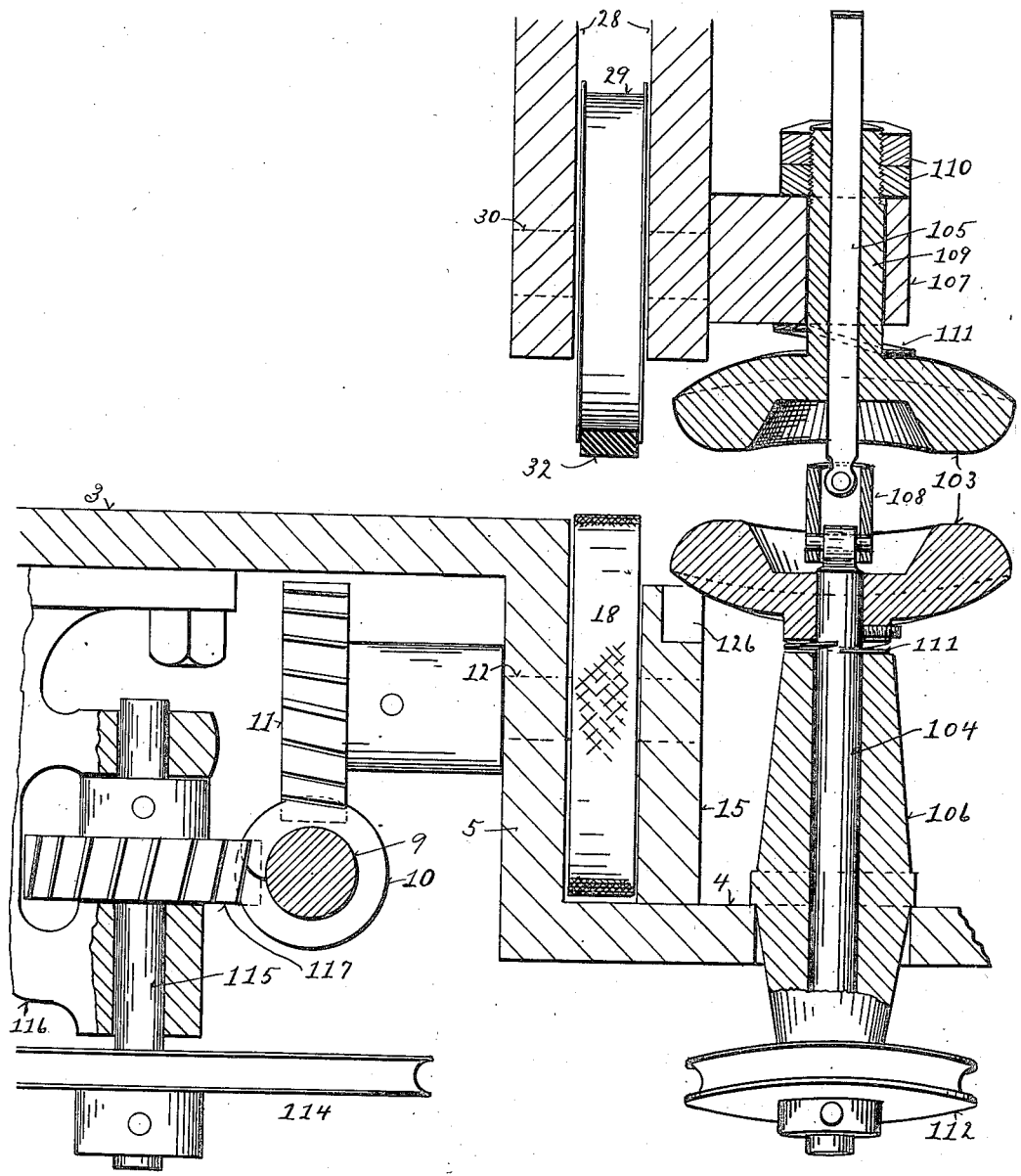

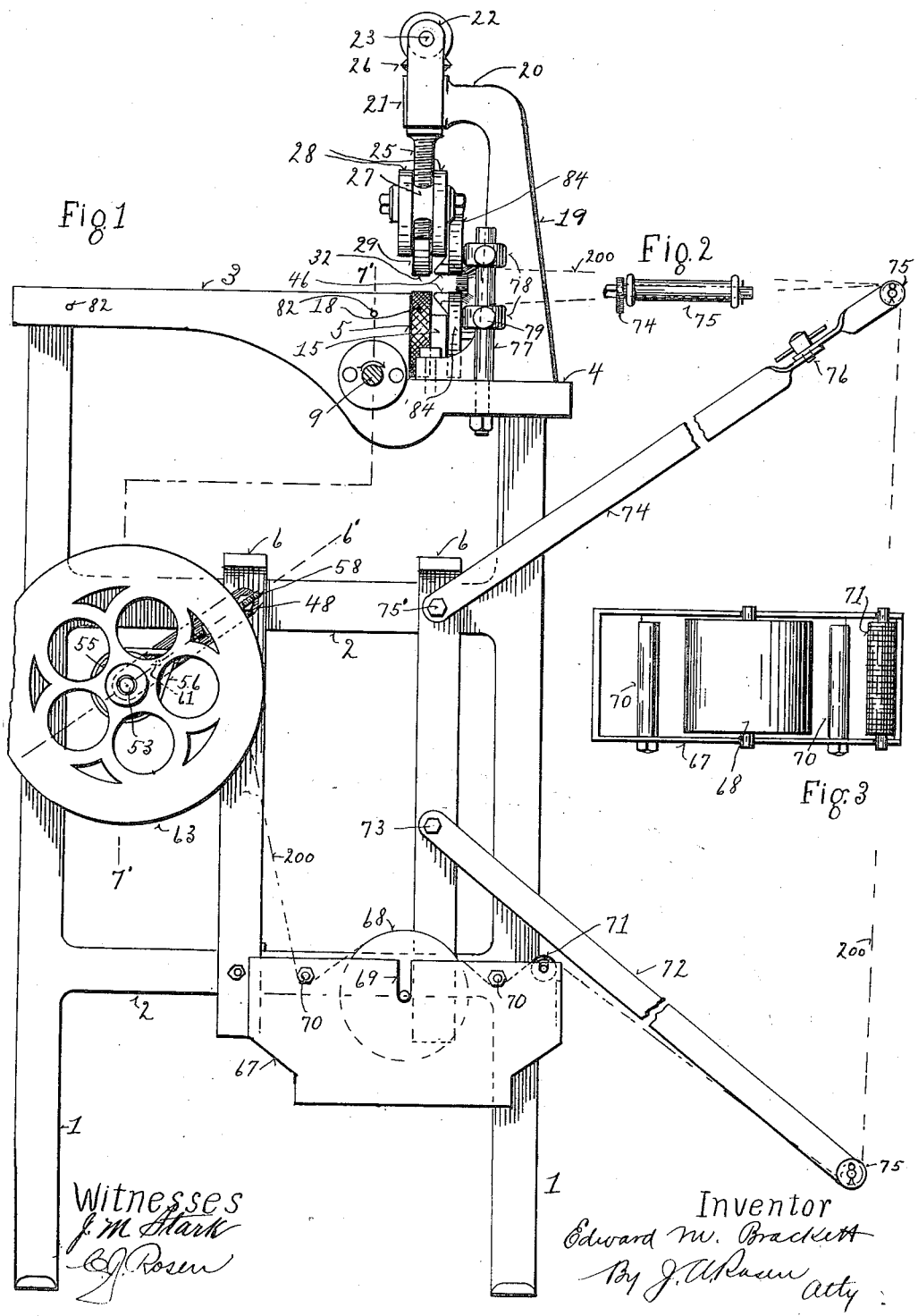

E. M. BRACKETT.
BOOK STRIPPING MACHINE.
APPLICATION FILED AUG. 19, 1913.
1,124,205.
Patented Jan. 5, 1915.
9 SHEETS—SHEET 2.
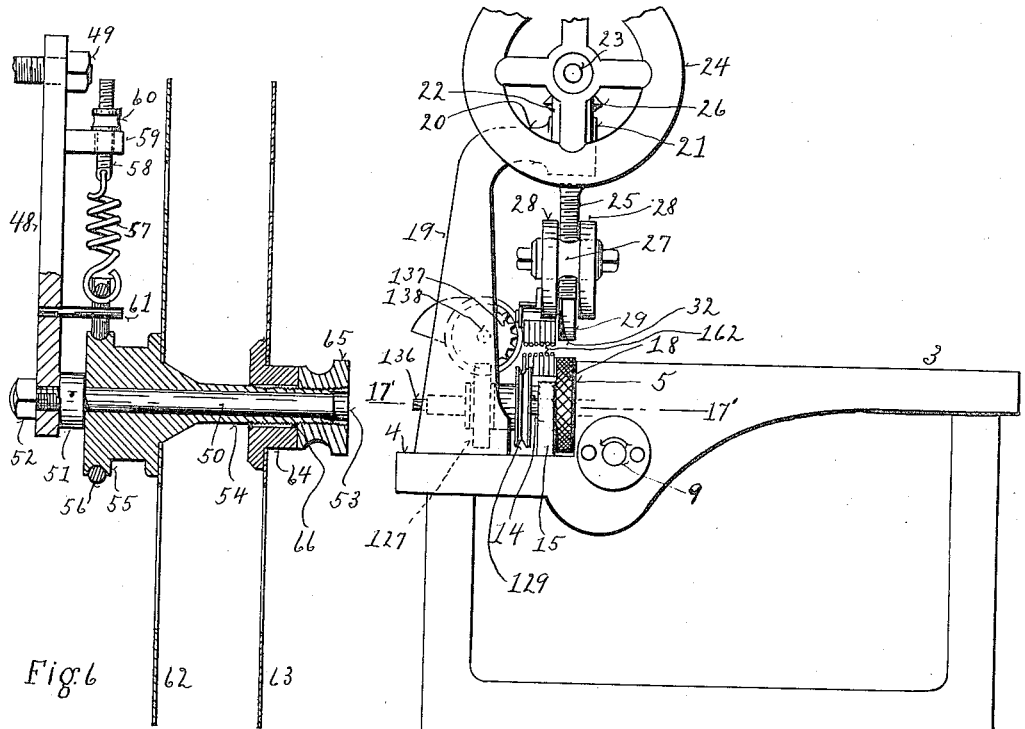
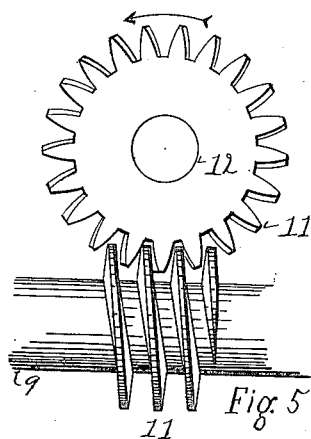
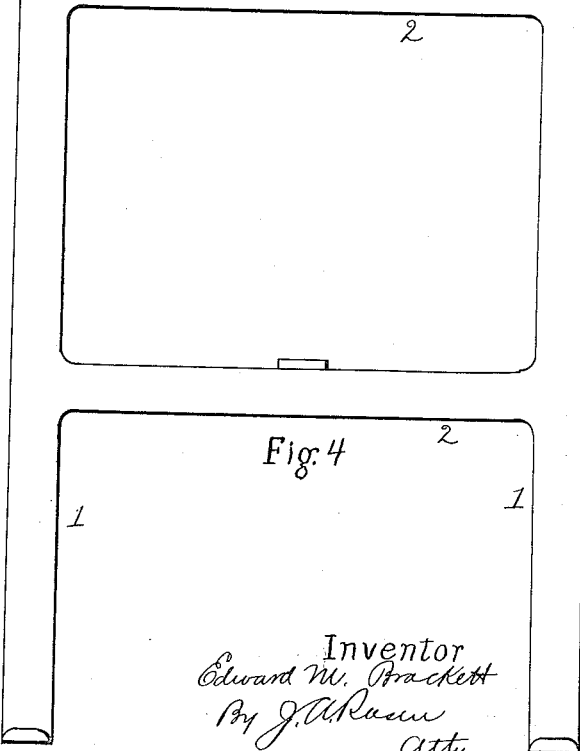
Witnesses
Inventor
Edward M. Brackett

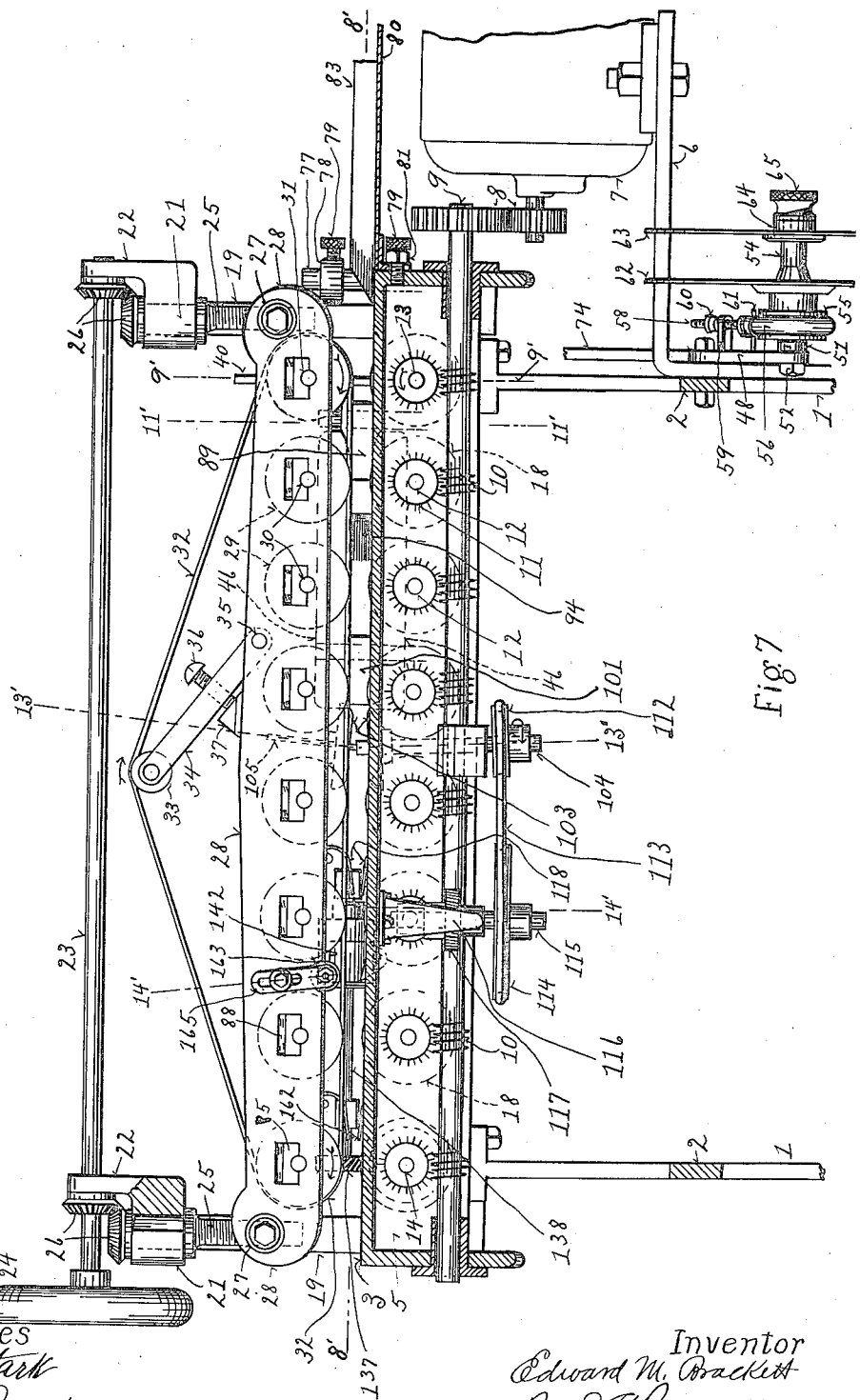

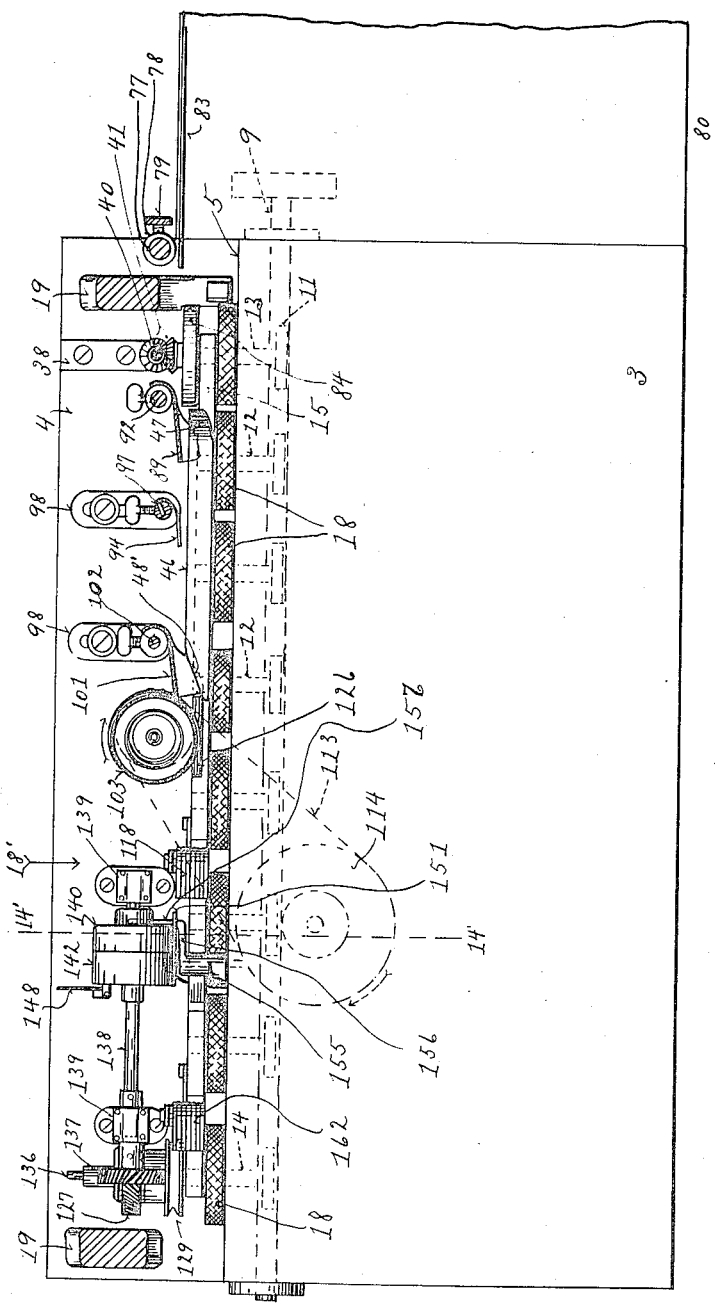

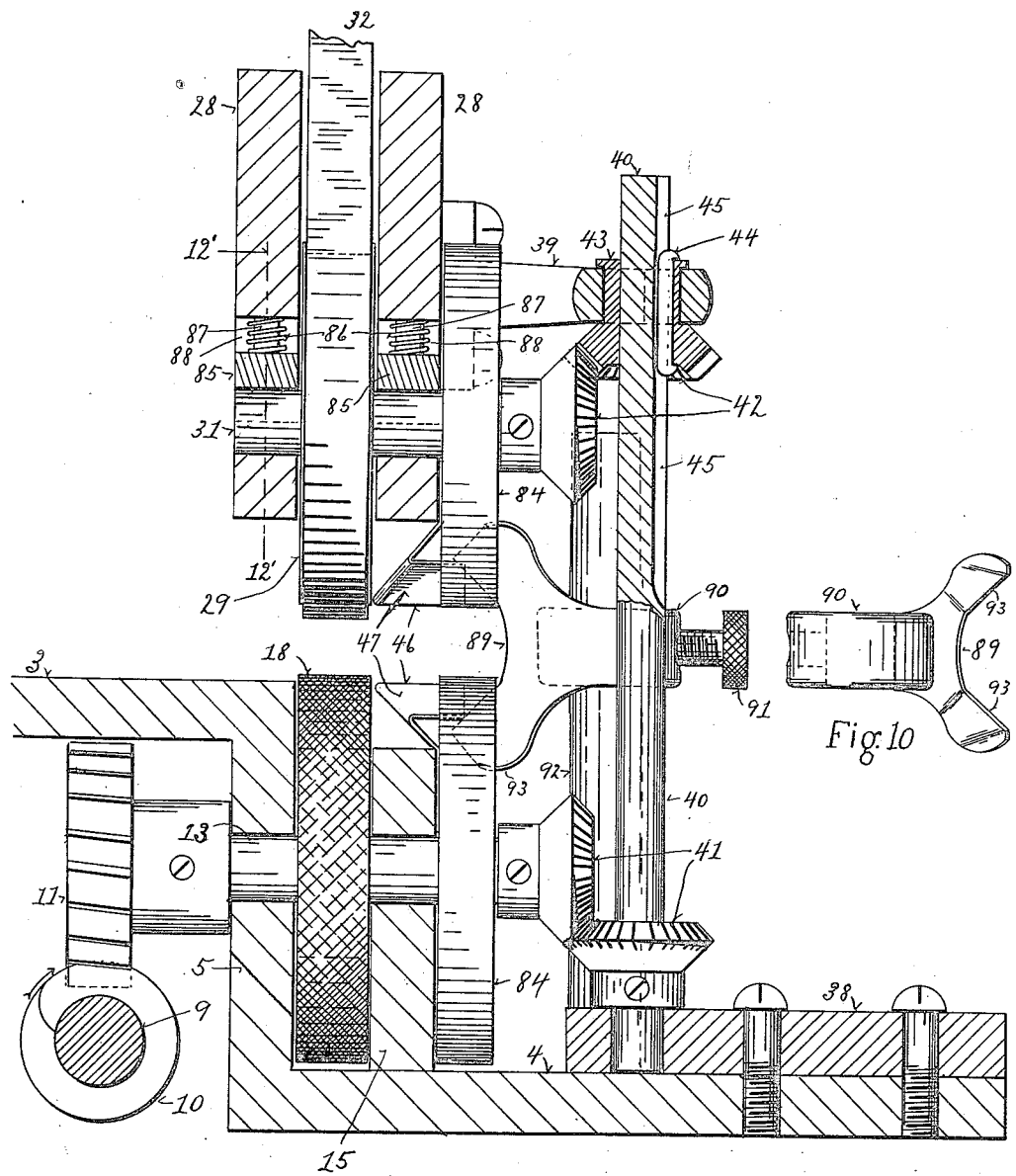

E. M. BRACKETT.
BOOK STRIPPING MACHINE.
APPLICATION FILED AUG. 19, 1913.
1,124,205.
Patented Jan. 5, 1915.
9 SHEETS—SHEET 6.
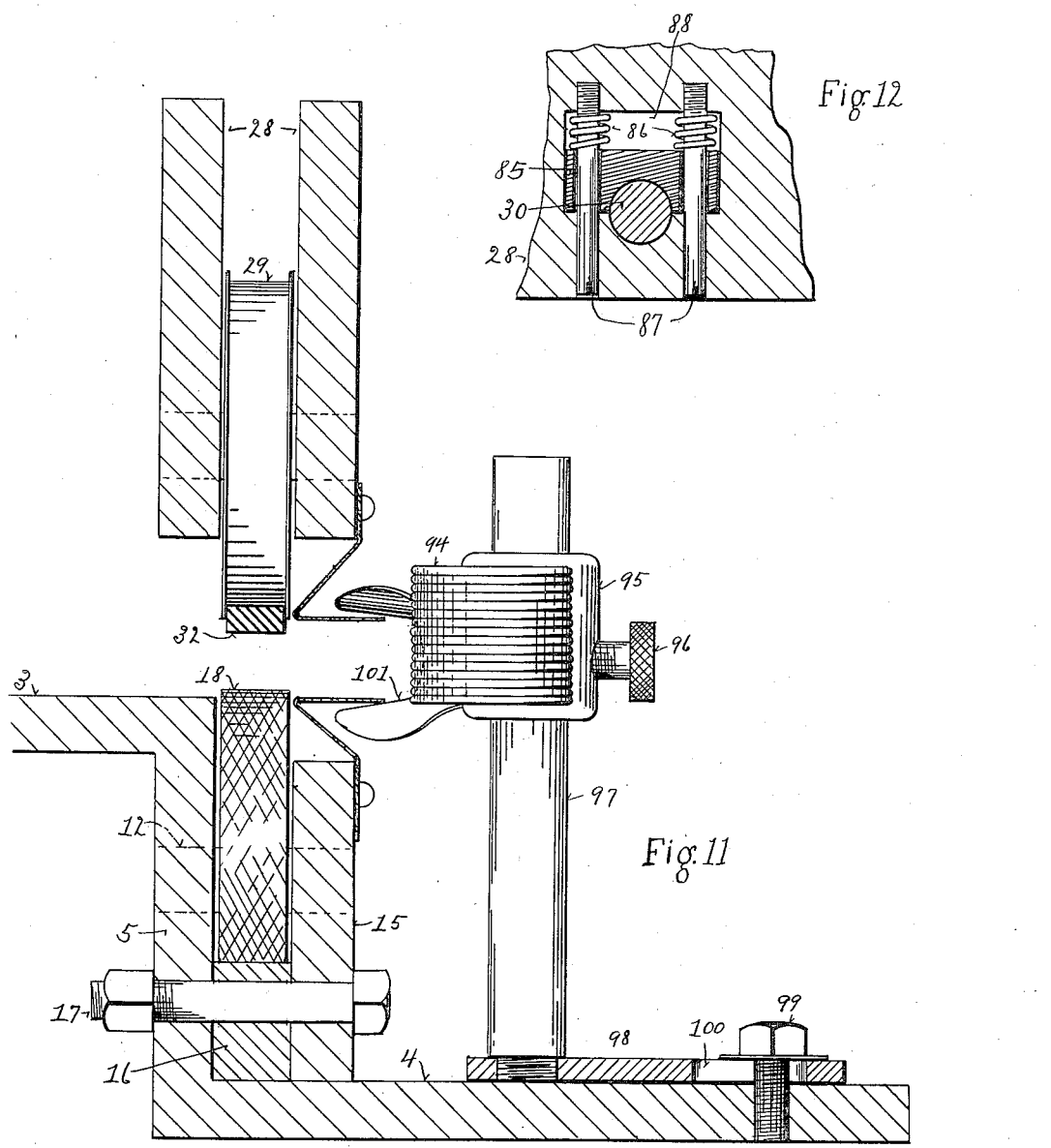

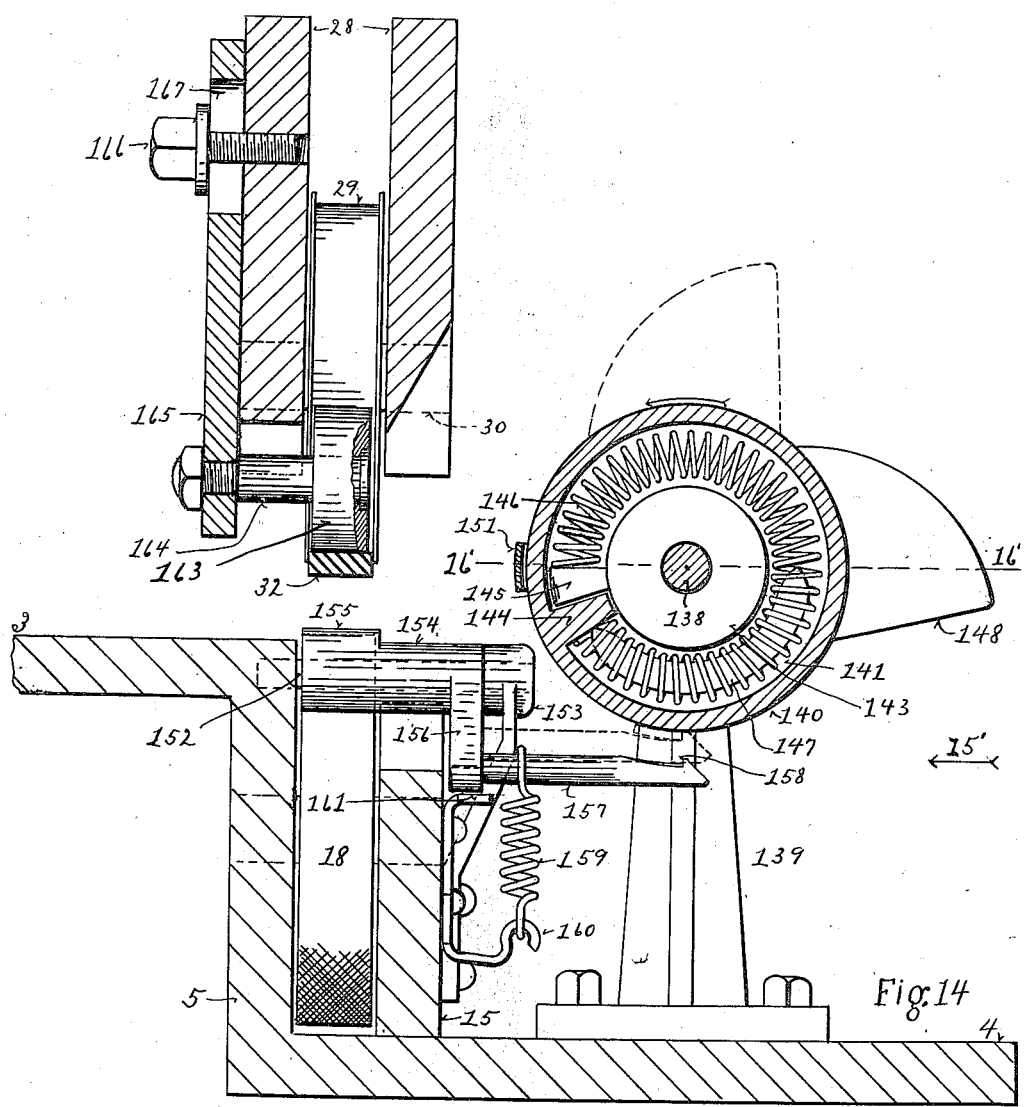
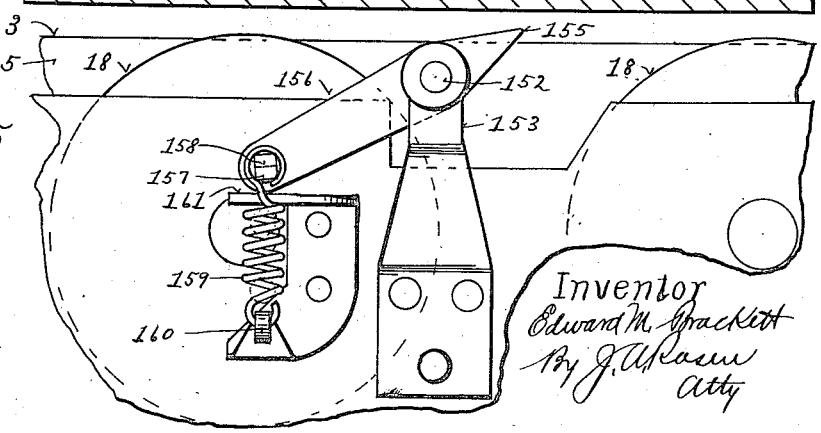

E. M. BRACKETT.
BOOK STRIPPING MACHINE.
APPLICATION FILED AUG. 19, 1913.
1,124,205.  Patented Jan. 5, 1915.
9 SHEETS—SHEET 9.
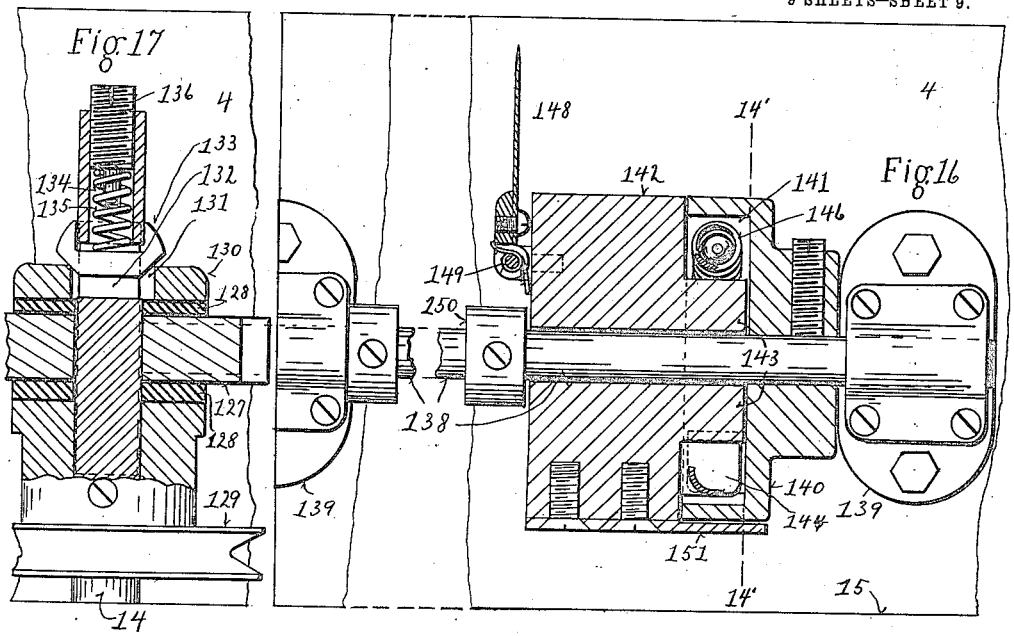
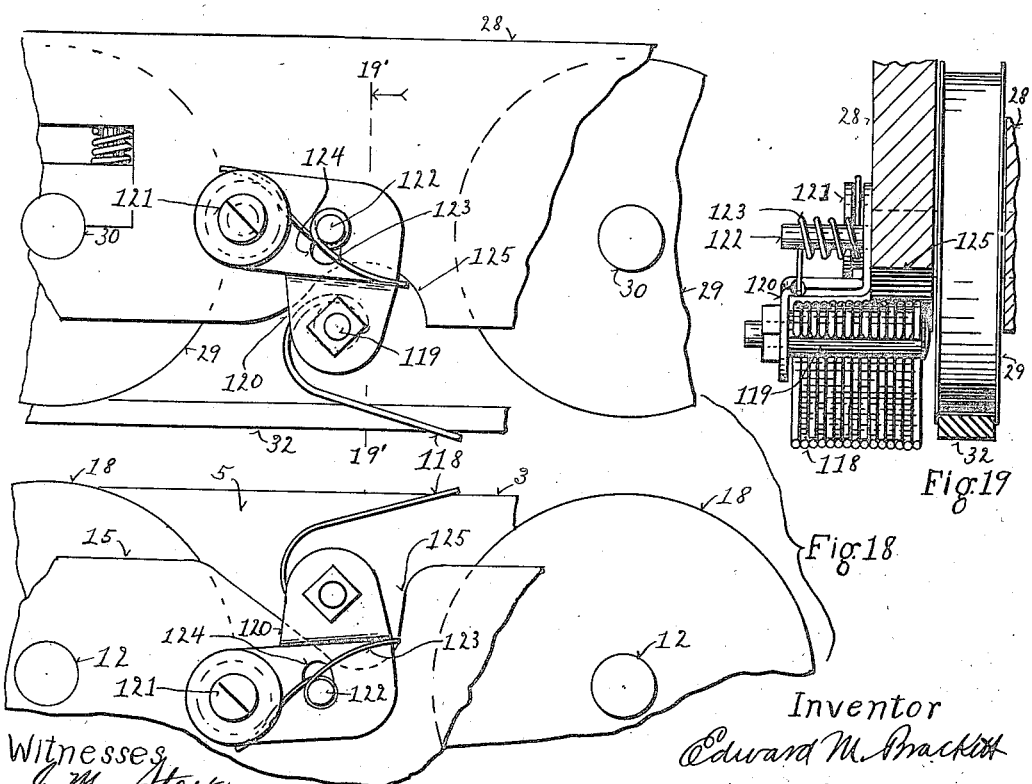
Witnesses
J. M. Stark
C. J. Rosen
Inventor
Edward M. Brackett
By J. A. Rosen
Atty

UNITED STATES PATENT OFFICE.

EDWARD M. BRACKETT, OF TOPEKA, KANSAS.

BOOK-STRIPPING MACHINE.

1,124,205.    Specification of Letters Patent.    Patented Jan. 5, 1915.

Application filed August 19, 1913. Serial No. 785,590.

*To all whom it may concern:*

Be it known that I, EDWARD M. BRACKETT, a citizen of the United States, residing at Topeka, in the county of Shawnee and State of Kansas, have invented certain new and useful Improvements in Book-Stripping Machines, of which the following is a specification.

My invention is a machine for affixing to the back and the adjacent portions of the top and bottom of tablets and other books the strip of gummed cloth by which they are bound, the operation being a continuous one in which the cloth is fed from a roll and the unbound tablets and other books are fed into the machine by hand or any suitable means, the machine automatically moistening the gummed cloth, affixing it to the work, cutting it between successive pieces of work, and wiping the cloth down firmly upon the work.

It is the object of my invention to provide a machine of this general nature that is simple in construction, simple and economical in operation, strong, durable, not easily gotten out of order, and that is adjustable so as to be adapted to a wide range of usefulness.

It is the further object, not only to improve upon the general combination and arrangement of parts, but also to improve upon the various details as hereinatfer specifically pointed out.

It is the further object of my invention to provide a machine of this general nature that is specially capable of applying the cloth binding strip to stapled books, such as blank check books and other similar blank books, catalogues, etc., of varying thicknesses, and to books having hinged covers, and to books on which the strip is to be turned over onto the bottom or top or both for much greater width than in the case of mere school and other similar tabs or tablets, the maximum width of such turned over edge of the strip ranging up to about one and one-eighth inches and the maximum thickness of such books ranging up to about one and three-eighths inches. And my invention consists of the parts, improvements, and combinations hereinafter set forth and claimed.

In the drawings accompanying and forming part of this specification and in the description of the drawings I have shown my invention in its preferred form and what I deem to be the best mode of applying the principles thereof; but it is to be understood that within the scope of the appended claims I contemplate changes in form, proportions, and materials, the transposition of parts, and the substitution of equivalent members, without departing from the spirit of the invention.

Figure 1 is an elevation of one end, the right-hand end, into which the unbound tablets and the cloth are to be fed, of a machine made in accordance with the principles of my invention. Fig. 2 is a view of one of the rollers over which the cloth passes between the water box and the stripping mechanism proper. Fig. 3 is a plan view of the water box in which the gummed cloth is moistened on the gummed side. Fig. 4 is an elevation of the other end of the machine, this being the end from which the stripped tablets or blocks are delivered. Fig. 5 is an enlarged detail of part of the worm gearing whereby the power is transmitted from the main drive shaft to the lower feed rollers. Fig. 6 is a sectional elevation, enlarged, of the reel which holds the roll of cloth, with an adjustable brake mechanism, the plane of the section being indicated by the line 6' in Fig. 1. Fig. 7 is a front elevation, the frame being shown in section on the planes indicated approximately by the line 7'—7' in Fig. 1. Fig. 8 is a plan view partly in section on a plane indicated by the line 8'—8' in Fig. 7. Fig. 9 is an enlarged sectional view on a plane indicated by the line 9'—9' in Fig. 7. Fig. 10 is a detail of one of the formers, the one shown in Fig. 9, viewed from the opposite direction. Fig. 11 is an enlarged sectional view on a plane indicated by the line 11'—11' in Fig. 7. Fig. 12 is a detail in section on the plane indicated by the line 12'—12' in Fig. 9. Fig. 13 is a sectional elevation, enlarged, showing the revolving wiper and the driving mechanism therefor, the plane of the section being indicated by the line 13'—13' in Fig. 7. Fig. 14 is an enlarged sectional elevation of the cloth-cutting mechanism, the planes of the section being indicated by the lines 14'—14' in Fig. 7 and Fig. 16. Fig. 15 is a view from the rear, as indicated by the arrow 15' in Fig. 14, of the trip and latch for controlling the cutter, with adjacent portions of the machine, but omitting the cutter mechanism. Fig. 16 is a plan view, partly in section on a plane indicated by the line 16'—16' in Fig. 14, of the cutter mechanism. Fig. 17 is a sectional plan view of the friction drive mechanism by which the cutter mechanism is driven, the plane of the section being indicated by the line 17'—17' in Fig. 4. Fig. 18 is a view from the rear of one of the two pairs of spring wipers with adjacent portions of the machine. Fig. 19 is a view from the direction of the left-hand end of the machine of one of the same wipers, the upper one of the pair, and the frame being shown in section on a plane indicated by the line 19'—19' in Fig. 18.

Similar reference characters indicate like or corresponding parts throughout the several views.

Supported upon suitable legs 1, with cross-braces 2, is the main supporting frame comprising the feed table 3, which has a smooth flat upper surface, and the ledge 4 which is at a lower level than the feed table, the two surfaces being connected by the vertical wall 5. At the right-hand end of the machine are a pair of brackets 6 which support a suitable motor 7 which, through gears 8, drives the main shaft 9 mounted in the main frame. The main shaft is a worm, as indicated at 10, adapted to drive the several gears 11 secured to the several shafts 12, and the end shafts 13 and 14, which extend through and have their one bearings in the vertical wall 5, their other bearings being in the bar 15, which extends parallel with said vertical wall and which is rigidly secured to the main frame and spaced apart from the vertical wall by means of a series of spacers 16 and bolts 17 (Fig. 11). Arranged successively from end to end of the machine between the vertical wall and the bar are a number, here shown as eight, feed rollers, mounted rigidly upon the several shafts 12 and the shafts 13 and 14, respectively. These feed rollers project but slightly above the level of the feed table and their peripheries are lightly knurled in order to grip the bottoms of the tablets.

Supported upon the ledge are two standards 19, one at each end of the machine, and each having at its upper end a forward projection 20, a vertical bearing 21 and a horizontal bearing 22, in the latter of which is mounted a shaft 23 having at one end a hand-wheel 24. In the respective vertical bearings are mounted the two screws 25 to which rotary motion is imparted from the shaft 23 by means of the bevel gears 26. The screws have threaded engagement with spacers 27, 27, respectively, extending between the opposite ends of the two bars 28 which form the supporting frame and the bearings for the upper feed rollers 29, of which there are eight in number, corresponding with and being respectively vertically opposite the lower feed rollers. The upper feed rollers are flanged in order to carry under them an endless belt 32, which returns from the left-hand end to the right-hand end over a pulley 33 mounted on a rod 34 pivoted between the bars 28 at 35; and the tension of the belt is regulated by means of the adjusting screw 36 bearing against the stop 37. The upper feed rollers are mounted upon and rigidly secured to the spindles or shafts 30 having their bearings in the respective plates 28. The upper half of each bearing is made of a separate member 85, normally held in place by means of compression springs 86 encircling the pins 87 screwed into the plates, and the plate has an opening 88 above each block 85 for the accommodation of the springs and to permit some play of the upper bearing blocks. The shaft for the upper feed roller at the right-hand end is indicated by the reference numeral 31, and it is from this shaft that the belt and the other upper feed rollers are driven.

Mounted in a bracket 38 secured to the main frame and a bracket 39 secured to the upper frame, is a vertical shaft 40 to which motion is transmitted from the shaft 13 by means of the bevel gears 41, and which in turn transmits motion to the shaft 31 by means of the bevel gears 42. The upper gear of the pair 42 has a long sleeve 43 which is rotatably mounted in the bracket 39, said gear being secured in turn to the shaft 40 by means of the key 44 in the keyway 45, the purpose of this arrangement being to permit vertical motion of the upper frame with respect to the lower frame without disturbing the power transmission from shaft 13 to shaft 31.

46 are two guides, parallel with each other and just back of the feed rollers, and parallel also with the feed rollers, their forward ends being vertically beveled, 47, and their rear (left-hand) ends being horizontally beveled, 48' (see Fig. 8). The purpose of these guides is to guide the edges of the tablet between the feed rollers and the back of the tablet in order to prevent the edges from turning up or down, and to hold the back in proper line to receive the binding cloth; its purpose will be more fully explained hereinafter in connection with adjacent mechanisms.

Referring now to the cloth-feeding mechanism shown in Figs. 1, 2, 3, 6, and 7; A bracket 48 is secured to the cross-brace by a bolt 49, and a spindle 50 is screwed into the outer end of the bracket and clamped in place by a collar 51 and a nut 52, the other end of the spindle having a slightly enlarged head 53.

54 is a hollow sleeve rotatably mounted on the spindle and having integral therewith or rigidly secured thereto a pulley 55 over which passes a belt 56 which is secured to one end of a spring 57, the other end of the spring being secured to a screw 58 which passes loosely through a post 59 and which is provided with an adjusting nut 60 bearing against said post, whereby the tension of the spring may be increased or diminished.

61 is merely a back-stop post in order to prevent the belt falling off the pulley in case the nut is too far loosened. The flange 62 of the reel is secured to the sleeve 54, and the flange 63 is secured to the collar 64 which is loosely mounted on said sleeve.

65 is a nut having threaded engagement with said sleeve, as shown at 66. The threaded outer end 66 of the sleeve is of larger diameter than the diameter of the head 53, so that the nut may be turned freely onto said sleeve without encountering the head. The purpose of this special arrangement is to adapt the reel to any size of cloth within a maximum width. The roll of cloth may be placed on the sleeve by unscrewing the nut and removing the collar 64 with its flange 63, then putting on the roll, and then restoring the removed parts and screwing up the nut. My brake device is also of special value in adapting my machine to a wide range of usefulness, for by means of it, and by the simple operation of turning the nut 60, the braking power may be increased or diminished to suit the work to which the machine may be used for the time being. The rolls usually consist of cloth gummed on one side, and it is therefore necessary to moisten the gummed side before stripping the tablets, and before the cloth enters the stripping mechanism proper. For this purpose I use a water box 67 in which rotates a large brass cylinder 67 whose spindles are mounted in the lower ends of slots 69 so as to be readily removable. On each side of the cylinder is a rod 70, each secured to one side of the box, but not reaching the other side, so as to permit the easy insertion of the cloth thereunder. At the end of the box is a roller 71. This is made of several plies of fabric, preferably duck. Water is placed in the box, and kept hot by any suitable means, as by an electric heater placed in the bottom of the box. The strip of cloth 200 comes from the roll upon the reel and passes first under the left-hand rod 70, thence up over the cylinder, thence under the right-hand rod, and thence over the fabric roller. I find that when the strip comes from the brass roller, the water is not evenly applied to the gummed surface, that scarcely any of the water adheres thereto, and that what little does adhere thereto is in spots and in globules. I also find that by keeping the fabric roller moist, the gummed surface is thoroughly and uniformly moistened.

Secured to the frame, as by a bolt 73, is an arm 72 which extends downwardly and away from the water box, and which has a roller 75 at its lower or free end. 74 is another arm, secured at 75' and extending upwardly and rearwardly, having at its rear end a roller 75, and having adjacent to its rear end an adjustable joint 76.

77 is a post set upon the ledge and having two collars 78 mounted thereon, vertically adjustable thereon, and secured thereto by means of thumb-screws 79. The strip of cloth 200, upon leaving the fabric roller 71 passes around the two rollers 75, and, after leaving the upper roller 75, it makes a quarter transverse turn or twist and passes around the guide-post 77, between the collars 78, with its side edges in vertical alinement; and the parts are so adjusted as to bring the strip into exact relationship with the tablets which are being propelled between the feed rollers, usually the center of the strip being in horizontal alinement with the center of the tablet gripped between the feed rollers.

As a supplementary device for feeding the tablets or blocks into the right-hand end of the machine, I provide a feed-board 80, secured to the frame by means of bolts or lag-screws 81, screwed into threaded holes 82 in the frame, so as to make the upper surface of the feed board level with the surface of the feed table. Along the rear edge of the feed-board is a flange 83 which is adjusted so that when the tablets to be stripped are placed on the feed-board with their backs against said flange, and then pushed therealong to the left and into the machine, they will be delivered into the machine in exactly proper position. This position is so that the feed rollers grip the tablets,—not at or close to the back,—but far enough from the back to allow of the stripping operation. Inasmuch as the upper and lower feed rollers all travel at exactly the same speed, there will be no tendency to twist or turn. Furthermore, by means of the hand-wheel and the operation of the screws 25, the upper feed rollers may be brought down with considerable pressure upon the tablets, or may be adjusted so that the tablets are carried through under considerable pressure. Furthermore, it will be noted that the pressure is not altogether unyielding; that each individual upper feed roller is subject to upward pressure against the stress of the springs 86, thus also permitting inequalities in the thicknesses of the work now and then, the machine automatically compensating for variations of thickness such as will unavoidably occur in running a job theoretically of exactly uniform thickness; and such compensation takes place in case of each irregularity without disturbing the work of the machine upon adjacent work.

Upon first entering the machine proper, the tablet, being carried along by the feed rollers, first enters between the oppositely placed rollers 84, one of which is mounted on the shaft 13 and the other on the shaft 31. The purpose of these two rollers is to drive in the staples, if there be any, in the unstripped tablet. In view of this function, it will be understood that the springs 86 which control the shaft 31 should be considerably more tensioned than the springs for the other shafts of the upper feed rollers. The strip of cloth here passes behind these rollers. The tablet next enters between the guides 46, whose right-hand ends are beveled so as to insure taking in the work. Immediately back of the right-hand or entrance end of the guides is the first former 89 whose wings 93 are only slightly inturned. The former is secured to a collar 90 adjustably secured by a set-screw 91 to a post 92 set upon the ledge. The purpose of this former is to bring the central portion of the cloth close to the back of the tablet and at the same time to turn over toward the top and bottom respectively of the tablet the edges of the strip; it being understood that in this machine, this process of bringing the strip from its straight up and down transverse position to its right-angular position upon the tablet is effected gradually, and the former just described is the first step. About midway of the guides is a spring wiper 94 composed of a brush of small wires secured to a collar 95 adjustably mounted upon a rod 97 and secured thereto by a set-screw 96, said rod being set upon a bracket 98 adjustably secured to the ledge by a bolt 99 passing through the slot 100. The free ends of the wires point in a general direction to the left and forwardly, and this wiper is so adjusted with relation to the work that it bears against the back with proper stress, its function being to wipe the gummed and moistened cloth against the back of the tablet while the edges of the strip are being shaped preparatory to being wiped against the bottom and top respectively of the tablet. The tablet next enters between the wings of the second former 101, which is for the same purpose as the former first described, except that its wings are more turned over in order to bring the edges of the strip almost down to the top and almost up to the bottom of the tablet, and prepares the strip to be wiped by the revolving wipers immediately following. This second former is mounted upon a rod 102 in a manner similar to the mounting of the first former upon its supporting rod, and the rod 102 is mounted upon an adjustable bracket 98. This former is close between the beveled end 48' and the revolving wipers next described.

I specially emphasize the importance of the second former 101. My own experience has demonstrated that if I attempted to wipe the over-turned edges of the binding cloth onto the book by turning in the wings of the former to such an extent that they would press the said edges against the book, the same would result in wrinkling the cloth. This will be more readily appreciated when it is understood that the moistened gummed strip is extremely flexible, sleazy, and susceptible to wrinkling, like a wet muslin cloth. I therefore so shape this former as to its wings that the wings bring the edges of the binding strip closely down to, but not quite touching, the adjacent portions of the book; and I also so adjust the former with relation to the work passing through the machine that the vertical portion of the former connecting the wings presses the corresponding portion of the strip firmly against the back of the book, and thus prepares the strip for being wiped as to its overturned edges onto the book by the rotary wipers immediately following. And in this connection it should also be noted that attention should be given to properly adjusting the tension of the brake on the tape reel hereinbefore described with relation to the work going through the machine.

It often happens that tablets are made without a board or other stiff bottom, or are thin, flexible or otherwise tending to get out of shape at the back where not supported. However, it will be understood that my two guides will always hold the back and the portion of the tablet between the back and the feed rollers in true alinement while the strip is being shaped to it and while the strip is being firmly pressed against the back by the wiper as described. It will also be understood that the edges of the strip do not pass between the guides.

The rotary wipers, shown on a small scale in Figs. 7 and 8, are shown in detail in Fig. 13. The bearing 106 for the shaft 104 for the lower member of the wipers 103 is so disposed as to incline the shaft slightly to the left from the bottom up, and the bearing 107 for the shaft 105 for the upper member is inclined slightly to the right from the bottom up. This arrangement tilts each member slightly toward the other from left to right, so as to cause the wipers to bear against the top and bottom of the tablet at their right-hand forward quarters, and inasmuch as the forward half of the members travel from right to left, with the work, the operation of these wipers compresses the two edges of the strip firmly against the bottom and top of the tablet as it is carried along therebetween, drawing the cloth forward from the back, thus firmly compressing the back and firmly applying the strip to the bottom and top of the tablet immediately adjacent to the back. But the travel of each of these wipers through its left-hand forward quarter is only a return movement, and on account of the tilt, does not bear against the tablet or cloth. The upper member has a long sleeve 109 directly mounted in the bracket 107, and held at its upper end by nuts 110. The shaft 105 is square, or angular, or otherwise mounted in said sleeve so as to be non-rotatable with relation to the sleeve but movable longitudinally of the sleeve, the purpose being to permit raising and lowering of the bracket 107 with the upper frame, and to permit vertical play of the member under influence of the work and the spring washer 111. There is one such spring washer for each member so that each may work under its influence and thus not only exert a yielding pressure, but also compensate for variations in the thickness of the work, as hereinbefore described. The two shafts are connected by a universal joint 108, so both wipers are operated in unison, and they are driven by a pulley 112 secured to the lower end of the lower shaft; a belt 113, a pulley 114 secured to shaft 115 mounted in a bracket 116 and carrying a gear 117 meshing with and driven by the adjacent worm 10 on the main drive shaft 9. The bar 15 may be cut away as shown at 126 to afford ample clearance for the lower member.

The tablet next enters between the top and bottom wipers 118. The position of these wipers is indicated in Figs. 7 and 8, and they are shown in enlarged detail in Figs. 18 and 19. The two are arranged oppositely to each other, one being adapted to wipe the bottom and the other the top, in order to press all parts of the two overlapped edges of the cloth firmly upon the tablet. They are each composed, similarly to the back wiper hereinbefore described, of a brush of small spring wires, whose free ends are adapted to bear against the work.
Each brush is secured on a spindle 119 secured to a bracket 120 pivoted to the rear one of the two plates 28 comprising the upper frame. A pin 122 secured to and projecting from the plate, has a spring 123 wrapped around it and bearing against the bracket to hold it with its brush against the work. The slot 124 in the bracket allows motion of the bracket under influence of the work and the spring. The lower wiper bracket is pivoted to the bar 15. The bar 15 and the plate 28 are each cut away, as shown at 125 to give room for the wiper to extend clear in almost to the feed rollers, it being the intent that these wipers shall cover both bottom and top from the feed rollers back to the extreme back edge of the tablet; and in this respect they may be extra width to allow for adjustments of the machine to varying widths of the overlapping portions of the cloth.

The next step is to cut the strip of cloth between contiguous tablets or blocks, preliminary to explaining which I will describe the cutter-driving mechanism, the details of which are shown in Fig. 17. Mounted upon the shaft 14, loosely, is a spiral gear 127, on each side of which is a leather washer 128; and contiguous to the front washer is a pulley 129 rigidly secured to the shaft for the purpose of driving a delivery mechanism for carrying the finished tablets away from the left hand end of the machine. A washer 130 fits against the rear leather washer and has a key-way 131 registering with a slot 132 through the shaft 14, through which slot and into which key-way extends a key 133. The parts are compressed between the rigidly secured pulley 129 and the key 133 by the stress of the compression spring 135 placed in the hollow portion of the shaft, as shown at 134, and forced against the key by the screw plug 136. The purpose of these parts is to afford a friction drive, the amount of friction being adjustable by screwing the plug in or out to increase or decrease the stress of the spring. The gear 127 meshes with a spiral gear 137 rigidly mounted on the shaft 138 having its bearings in standards 139 extending up from the ledge. Rigidly secured on the shaft is a shell 140 having a circular hollow chamber 141.

142 is a rather heavy knife-hub having a boss 143 projecting into said shell and forming in connection with said shell the circular spring chamber 141. The shell has a lug 144 extending into said chamber, and the knife-hub also has a lug 145 extending thereinto, they being in the same path so as to strike against each other, the knife-hub being mounted loosely on the shaft 138. A compression spring 146 is placed in the spring chamber, and bears between the two lugs and normally forces the two lugs together. Hence the mechanism normally travels in the relative positions shown in Fig. 14. The knife-hub carries a knife 148, secured thereto by means of a spring hinge 149 which permits the knife to be swung to the left as viewed in Fig. 16, for a purpose hereafter described. The knife is of such length and is so mounted that its outer end swings in close to the feed rollers,—sufficiently close to insure cutting the entire width of the cloth between the contiguous tablets. The knife-hub is held in close, though movable, relation with the shell by the collar 150, and is provided with a finger 151 for stopping it as will be presently explained. Mounted upon a pin 152 extending between the vertical wall 5 and a bracket 153 secured to the bar 15 is a sleeve 154 having, in line with the feed rollers an upwardly projecting tripping arm 155, and having at its rear end an arm 156 from whose ends rearwardly projects the pin 157 having at its rear end a hook or catch 158. This hook is normally held down by a spring 159 which is secured at its lower end to a hook 160 formed of a plate whose upper edge forms a stop 161 against which the arm 156 strikes and which limits its downward movement under influence of the spring. In this normal position, the arm 155 projects decidedly above the level of the feed table 3. But when the tablet enters upon the arm 155, the parts are oscillated so as to bring the pin and hook 158 to the position shown in the dotted outline in Fig. 14, in which position the hook is directly in the path of the finger 151. As the mechanism still operates, however, the shaft 138 continues to rotate, carrying with it the shell 140 and compressing the spring 146 until the loose core 147 bears against both lugs 144 and 145, the purpose of the core being to prevent undue compression of the spring; and when this position is reached, with the knife projecting upward as indicated in the dotted outline in Fig. 14, the friction drive associated with the spiral gear will slip. Or it may be that the stress of the friction drive may be so weak as to slip before the spring 146 has been compressed to its maximum. This, however, is a matter of adjustment, the machine having a wide range of adjustment to meet the demands of many kinds of work.

It will be noted that the knife is approximately in line with the left-hand end of the tripping arm 155. Upon release of this arm from the right-hand side of the tablet, the spring pulls down the parts so as to free the hook 158 from the finger 151, permitting the spring to force the knife-hub and with it the knife around to its normal position with relation to the shell, which movement forces the knife across the cloth and cuts it at the side of the tablet which has just been released from the tripping arm 155; upon which the friction drive again becomes active as to the shaft 138. Inasmuch as the knife is left in no particular position after its cutting action and before it has again been brought to its normal position ready for the cutting swing, it is possible that while being driven to its normal position it may again cut across the path of the binding cloth,—or would do so but for the fact that the knife is secured to the hub by means of the spring hinge 149 (see Fig. 16). The driving of the hub and knife to their normal position is slow, however, and if the knife should during such movement be brought in contact with the binding cloth, the movement of the book and binding cloth from right to left will merely cause the knife to swing similarly on its spring hinge, harmlessly and without cutting or even marring the cloth; and upon passing the cloth the spring hinge restores the knife to normal position with relation to the hub upon which it is mounted.

Immediately above the tripping arm 155 is a small press roller 163 mounted on a stub shaft 164 secured to a plate 165, which plate is adjustably secured to the plate 28 by means of a lag-screw 166 passing through the slot 167 and into the plate 28. The purpose of this press roller is to prevent the tablet from bulging up over the tripping arm without tripping it, as might be the case where the machine were used in stripping thin or flexible tablets. Furthermore, by means of the press roller, a most delicate adjustment can be had to insure the proper working in sequence of the tripping arm and mechanism to and including the cutting blow of the knife.

Inasmuch as the gum is still moist when the cloth is cut, the cutting may loosen it from the tablet. Hence, I provide another pair of wipers 162, exactly similar to those shown at 118, except that they are located to the left of the cutter and operate upon the tablet after the cloth has been cut; they perform the function of finally wiping the bottom and top of the tablet to cause the cloth to adhere firmly to the tablet.

When starting a job, it is well to insert the first tablet properly positioned between the first feed rollers and between the staple-driving rollers, and then, by manipulation of the hand-wheel, bring the upper frame down to bear quite firmly upon the work. It will thus be understood that my machine is adapted to a wide range of work as to thickness of tablet. All parts automatically adjust themselves to the thickness of the tablet with the upper frame, except that I contemplate the use of several formers to secure best results in various classes of work.

I find the spring wipers especially efficient in firmly pressing the cloth to the tablet, as the individual wires permit conforming to the shape of the tablet; for instance, in some cases as with check books, where the edge of the top does not correspond with the back of the tablet; also I find that with the springs there is no tendency to wrinkle the cloth. The leather belt between the upper feed rollers and the work is also especially efficient; while it affords a slightly yielding though firm grip upon the work, yet it will not mark, mar, or mutilate the top of the tablet, this feature being particularly desirable where the top of the tablet is delicately finished. It is to be understood that my machine may be used for stripping other books than tablets.

The feed mechanism herein shown, comprising the feed rollers and associated parts, forms the subject-matter of another application, Serial No. 876,022, filed by me December 8, 1914; and the strip cutting mechanism herein shown forms the subject-matter of another application, Serial No. 876,021, filed by me December 8, 1914; and both of the latter applications are divisions of this original application.

What I claim is:

1. In a book stripping machine, the combination of a frame comprising a flat feed table, a ledge at the rear of the feed table and on a level below the same, and a vertical wall between the table and the ledge and extending lengthwise of the machine; feeding devices for propelling the work lengthwise of the machine; a reel for supporting a roll of cloth; an adjustable brake for the reel; a water-box and rollers therein for moistening the cloth; guides for guiding the cloth into the machine proper; formers for shaping the cloth approximately to the work; a wiper between the formers for pressing the cloth against the back of the work; a pair of rotary wipers succeeding the formers for pressing the edges of the cloth to the bottom and top of the work; a pair of wipers succeeding the rotating wipers and each comprising a brush of spring wires, said last-named wipers being opposite to each other and bearing against the bottom and top of the work; a cutter succeeding the last-named wipers for cutting the cloth between contiguous pieces of work; and a pair of wipers succeeding the cutter and bearing against the bottom and top of the work; said shapers, wipers and cutter being supported on said ledge.

2. In a book stripping machine, the combination of a frame comprising a feed table, a ledge below the level of the feed table and at the rear thereof, and a vertical wall extending lengthwise of the machine and between the table and the ledge; feed mechanism mounted on the frame for propelling the work lengthwise of the machine; and formers, wipers, and a cutter mounted on said ledge for shaping the cloth to the work, for pressing it firmly to the back and bottom and top thereof, and for cutting it between contiguous pieces of work.

3. In a book stripping machine, the combination of a frame, two sets of feeding devices arranged lengthwise of the frame and adapted to engage the bottom and the top of the work, two oppositely disposed guides alined approximately with the respective feeding devices for guiding the portion of the work adjacent its back which projects back of the feeding devices, formers adapted to turn the edges of the strip over toward the bottom and top of the work and arranged close to said guides, and a wiper arranged back of said guides and between the formers for pressing the strip firmly against the back of the work.

4. In a book stripping machine, the combination of a frame, feeding devices arranged lengthwise of the frame and adapted to engage the bottom and top of the work, means for guiding a binding strip back of the work, formers for gradually and approximately conforming the strip to the back and the bottom and top of the work, a wiper for pressing the strip against the back of the work, a guide between said wiper and the feeding devices for holding the back and adjacent portion of the work in alinement, and wipers for pressing the edges of the strip against the bottom and top of the work.

5. In a book stripping machine, the combination of a frame, feeding devices adapted to engage the bottom and top of the work, means for guiding a binding strip to the work back of the feeding devices, a pair of guide plates back of the feeding devices and approximately corresponding with the feeding devices to keep the back of the work in alinement, formers back of said guides to conform the edges of the strip to the bottom and top of the work, and a wiper back of said guides to press the strip firmly against the back of the work while said work passes between said guides.

6. In a book stripping machine, the combination of a frame, feeding devices to propel the work through the machine, means for guiding a binding strip into the machine behind the feeding devices, guides for guiding the back of the work back of the feeders, a wiper to press the strip against the back of the work, formers to conform to the edges of the strip to the bottom and top of the work, and a pair of oppositely disposed and oppositely tilted rotating wipers succeeding said shapers and adapted to bear against the bottom and top respectively of the work adjacent its back and to rotate in such direction as to exert a pull from the back of the work toward the feeding devices.

7. In a book stripping machine, the combination of a frame, suitable feeding devices for propelling the work through the machine, suitable means for guiding a binding strip into the machine behind the feeders at the back of the work, formers for conforming the edges of the strip to the bottom and top of the work, a wiper for pressing the strip against the back of the work, and, next succeeding, a pair of rotating wipers, said rotating wipers being disposed in opposition to each other, each having a generally horizontal position but being tilted toward the other at its forward edge, and being adapted to rotate as to its side nearest the feeding devices in the same direction as the feeding devices, and said wipers being beveled at their edges which engage the work, and being so located as to grip the bottom and top of the work between them at the back of the work.

8. In a book stripping machine, the combination of a frame, feeding devices arranged therein to propel the work through the machine, strip formers and a back wiper, a shaft mounted vertically in the frame back of the feeding devices and succeeding the formers and inclined at a slight angle from the lower end up away from said formers, a beveled rotary wiper secured to said shaft and arranged so as to bear with its forward first quarter against the bottom of the work adjacent its back, another shaft mounted in the frame vertically with a slight incline in the opposite direction, a beveled rotary wiper secured to said shaft and arranged so as to bear with its forward first quarter against the top of the work adjacent its back in opposition to the first-named rotary wiper, a universal joint connecting said two shafts, and means for driving said shafts.

9. In a book stripping machine the combination of a main frame, a set of feeding devices mounted therein to engage the bottom of the work, a frame adjustably mounted above the main frame, a set of feeding devices mounted therein to engage the top of the work, a pair of tilted rotary wipers arranged at the rear of the feeding devices, tilted shafts for operating said wipers, a universal joint connecting said shafts, means for driving said shafts, the upper shaft having relatively non-rotatable and longitudinally movable engagement with its wiper.

10. In a book stripping machine, the combination of a lower main frame, an upper frame supported on the lower frame, a set of feeding devices arranged in each frame and disposed opposite to each other, means for driving said feeding devices, means for guiding a binding strip into the machine back of the feeding devices, means back of the feeding devices for shaping the strip to the back, bottom and top of the work and for pressing the strip against the back of the work, and a pair of wipers secured respectively to the two frames and disposed oppositely to each other and adapted to bear against the top and bottom of the work, each of said last-named wipers comprising a brush of substantially parallel spring wires having free ends extending in the general direction of the movement of the work and at an angle toward each other.

11. In a book stripping machine, the combination of a frame, feeding devices mounted therein, means for driving the feeding devices, and a pair of oppositely disposed wipers adapted to bear against the bottom and top of the work, each wiper comprising a brush of substantially parallel spring wires extending in a general direction corresponding with the movement of the feeding devices and at an angle toward each other.

12. In a book stripping machine, the combination of a frame, feeding devices mounted therein, driving means for the feeding devices, a bracket pivoted to the frame, a spring for pressing the bracket toward the work, and a brush of spring wires secured at one end to the bracket, the other ends of the wires being free and extending in a general direction corresponding with the movement of the feeding devices and at an angle toward the work, said free ends being adapted to bear against the work and to press the strip firmly thereon.

13. In a book stripping machine, the combination of a frame, suitable feeding devices mounted therein, driving means for the feeding devices, means for guiding a binding strip into the machine back of the feeding devices, means for applying the strip to the work passing through the machine, and a pair of oppositely disposed staple-driving rollers at the receiving end of the machine.

14. In a book stripping machine, the combination of a frame, suitable feeding devices mounted therein, means for driving the feeding devices, means for guiding a binding strip into the machine back of the feeding devices, a pair of staple driving rollers at the receiving end of the machine operable by said driving means, formers following said staple driving rollers to conform the edges of the strip to the back, bottom and top of the work, a wiper between the formers to press the strip against the back of the work, a guide between said wiper and formers, and the feeding devices, for keeping the back of the work in alinement, a pair of rotary wipers following the formers for pressing the strip against the bottom and top of the work and drawing it tightly across the back, suitable power transmission mechanism between the driving means and said rotary wipers, a pair of oppositely disposed spring wire wipers following said rotary wipers and adapted to bear against the bottom and top of the work, respectively, a knife following said last-described pair of wipers for cutting the strip between successive pieces of work, actuating means for the knife, controlling means for the knife controlled by the work, and a pair of oppositely disposed wipers following said knife bearing against the bottom and top of the work.

15. In a book stripping machine, the combination of a frame, two sets of feeding devices mounted on the frame, and adapted to engage the top and bottom of the work and to move it lengthwise of the frame, two flat-surfaced guides alined approximately with the engaging faces of the respective feeding devices and located immediately back of said feeding devices for guiding the portion of the work projecting back of said feeding devices, devices for guiding a binding strip into the machine back of said guides, an adjustable tensioning device adapted to exert a backward pull on the binding strip, a former back of the forward end of said guides having wings slightly inclined toward the work and adapted to slightly turn the edges of the strip toward the work, a wiper succeeding said former and adapted to press the strip against the back of the work, a second former succeeding said wiper and guides having wings turned over toward the top and bottom of the work said wings being adapted to bring the turned-over edges of the strip almost but not quite to said top and bottom of the work and the connecting portion of said former being adjusted to press the corresponding portion of the strip against the back of the work, and a pair of wipers succeeding said second former adapted to wipe the turned over edges of the strip upon the top and bottom of the work.

16. In a book stripping machine, the combination of a frame, feeding devices mounted in the frame and adapted to engage the top and bottom of the work and to move it lengthwise of the machine, a pair of guides immediately back of the feeding devices and alined approximately with the engaging surfaces of the feeding devices for guiding the portion of the work projecting back of said engaging surfaces, devices for guiding a binding strip into said machine back of the feeding devices, a wiper back of said guides for wiping said strip onto the back of the work, a former succeeding said wiper and guides, said former comprising a web portion adapted to bear against the back of the work and wings turned over toward the top and bottom of the work respectively and adapted to bring the edges of the strip almost but not quite in contact with said top and bottom, and wipers succeeding said former and adapted to press the turned over edges of the strip onto the top and bottom of the work.

17. In a book stripping machine, the combination of a frame, feeding devices mounted in the frame and adapted to engage the top and bottom of the work and to move it lengthwise of the machine, a pair of guides immediately back of the feeding devices and alined approximately in the same planes with the engaging surfaces of the feeding devices for guiding the portion of the work projecting back of said surfaces, devices for guiding a binding strip into the machine back of the feeding devices, an adjustable tensioning device for exerting a backward pull on the strip, a wiper back of the guides for wiping the strip upon the back of the work while the work is fed through said guides, a former succeeding said wiper having a portion bearing against the back of the work and having wings adapted to turn the edges of the strip over close to but not quite touching the top and bottom respectively of the work, and a suitable wiping device succeeding the former for wiping said overturned edges upon the top and bottom of the work.

18. In a book stripping machine, the combination of a frame, feeding devices mounted therein for feeding the work therethrough, a pair of guides immediately back of the feeding devices for guiding the portion of the work extending back of the feeders, devices for guiding a binding strip into the machine back of the guides, a wiper back of the guides for wiping the strip onto the back of the work, a former following said guides adapted to bear against the back of the work and having wings adapted to bring the edges of the strip over to but not quite touching the top and bottom of the work, and wiping devices following said former adapted to wipe said turned over edges against the top and bottom of the work.

19. In a book stripping machine, the combination of a frame, feeders mounted therein for feeding the work therethrough, a pair of guides immediately back of the feeders, a wiper back of the guides for wiping a strip onto the back of the work, a former following said wiper and guides and having wings adapted to bring the edges of the strip closely to but not in contact with the top and bottom of the work, and the connecting portion of the former bearing against the back of the work, and wipers following the former for wiping said turned-over edges of the strip onto the top and bottom of the work.

20. In a book stripping machine, the combination of a frame, feeders mounted therein for feeding books therethrough lengthwise of the edges to be stripped, devices for guiding a binding strip into said machine adjacent to the said edge, a wiper to wipe said strip against the back of the work, a former succeeding said wiper and having a portion adapted to bear against the back of the work and wings adapted to turn the edges of the strip over close to but not quite touching the top and bottom of the work, and wipers succeeding the former for wiping said turned over edges onto the work.

21. In a book stripping machine, the combination with a frame, devices for feeding the work therethrough and devices for guiding the binding strip thereinto; of a former having wings capable of turning the edges of the binding strip close to but not quite in contact with the top and bottom of the work, means associated with the former for pressing the strip against the back of the work, and wipers immediately succeeding the former for wiping the overturned edges of the strip onto the top and bottom of the work.

22. In a book stripping machine, the combination with a frame, devices for feeding the work therethrough and devices for guiding the binding strip thereinto; of a former having wings extending in a general right angular direction from the back of the work toward the front of the machine and slightly diverging toward their front edges, means associated with said wings for wiping the strip against the back of the work, said wings being so disposed as to bring the strip almost to but not quite touching the top and bottom of the work, and wipers immediately succeeding said former for wiping the strip onto the top and bottom of the work.

23. In a book stripping machine, the combination with a frame, devices for feeding the work therethrough and devices for guiding the binding strip thereinto; of a former having wings above and below the work extending in a general right angular direction from the back of the work toward the front of the machine and slightly diverging toward their front ends, means associated with said wings for wiping the strip against the back of the work, said wings being so disposed as to bring the strip close to but not quite touching the top and bottom of the work, and rotary wipers immediately succeeding the former, for wiping the strip onto the top and bottom of the work, said rotary wipers having a wiping movement against the strip both toward the front of the machine and in the direction of travel of the work.

In testimony whereof I have affixed my signature in presence of two witnesses.

EDWARD M. BRACKETT.

Witnesses:
W. A. STANFIELD,
J. M. STARK.